R. R. VOGAN.
ROTARY ENGINE.
APPLICATION FILED AUG. 27, 1918.

1,303,745.  Patented May 13, 1919.
3 SHEETS—SHEET 1.

WITNESSES

Inventor
R. R. Vogan,
By Victor J. Evans.
Attorney

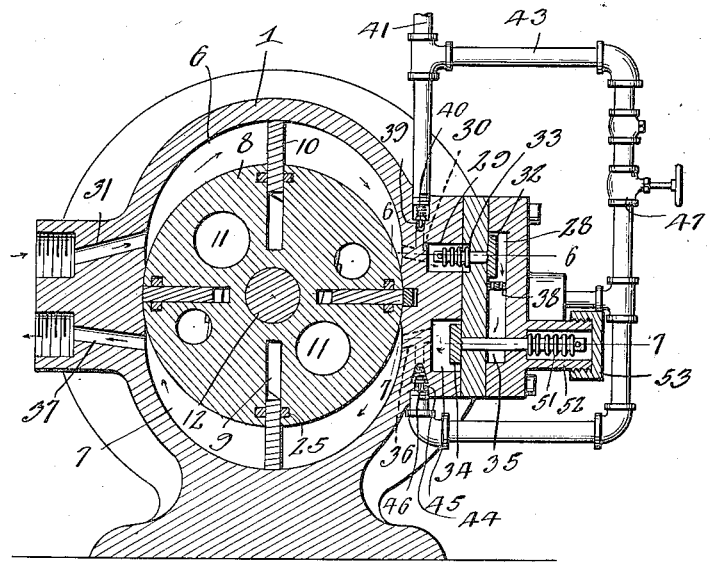
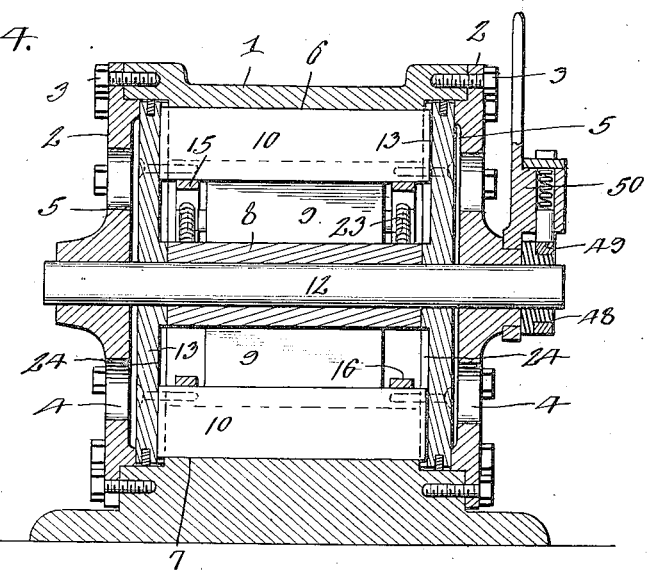
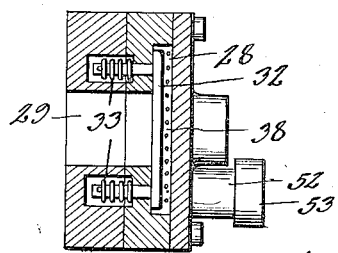

R. R. VOGAN.
ROTARY ENGINE.
APPLICATION FILED AUG. 27, 1918.

1,303,745.

Patented May 13, 1919.
3 SHEETS—SHEET 3.

WITNESSES

Inventor
R. R. Vogan,
By Victor J. Evans
Attorney

UNITED STATES PATENT OFFICE.

ROBERT R. VOGAN, OF BIRMINGHAM, ALABAMA.

ROTARY ENGINE.

1,303,745.                     Specification of Letters Patent.      Patented May 13, 1919.

Application filed August 27, 1918. Serial No. 251,650.

*To all whom it may concern:*

Be it known that I, ROBERT R. VOGAN, a citizen of the United States, residing at Birmingham, in the county of Jefferson and State of Alabama, have invented new and useful Improvements in Rotary Engines, of which the following is a specification.

This invention relates to rotary engines of the internal combustion or explosion type. The object of the present invention is to produce a rotary engine of the class referred to which embodies a self starting feature, the construction and operation of which insures the storage of a charge of mixture under compression which may be released to the combustion or expansion chamber of the engine and ignited automatically for starting purposes, after which the engine takes up its own cycle of operation, performing the four steps of a four cycle engine.

A further object of the invention is to provide in conjunction with a stationary casing of elliptical formation, a rotor having radial movable wings, combined with novel means for pressing said wings outwardly into working contact with the peripheral wall of the casing.

The invention also provides for ventilating or cooling the rotor, and also means for preventing back firing.

A further object of the invention is to provide means for protecting and preventing the over heating of the springs which yieldingly hold the inlet and outlet valves of the combustion chamber closed. The construction also provides for four explosions in each complete revolution of the engine shaft, thus reducing vibration and adding to the power efficiency of the engine.

With the above and other objects in view, the invention consists in the novel construction, combination and arrangement of parts, as herein illustrated, described and claimed.

In the accompanying drawings,

Fig. 3 is a sectional view of the engine taken at right angles to the engine shaft.

Fig. 4 is a sectional view taken about in line with the engine shaft, the latter being shown in elevation.

Fig. 6 is a fragmentary section on the line 6—6 of Fig. 3.

Figure 1:
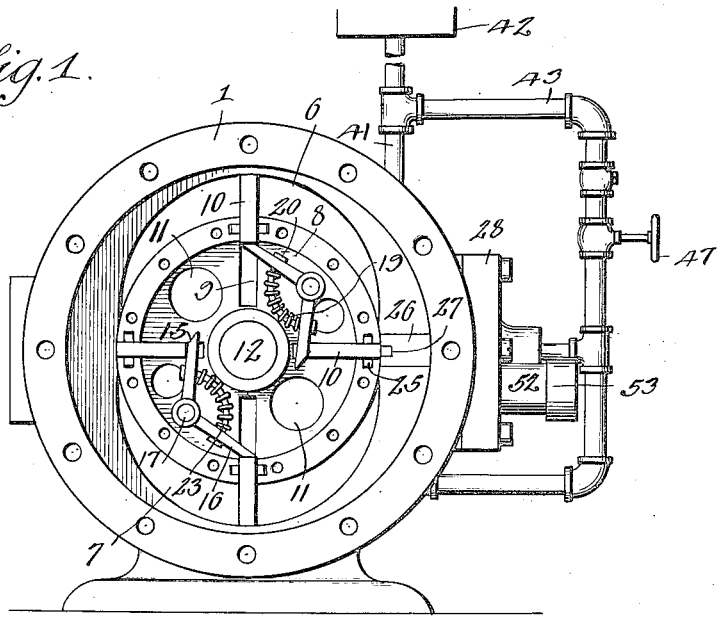
Figure 1 is a side elevation of the improved engine with the adjacent heads of the casing and rotor removed.
Figure 2:
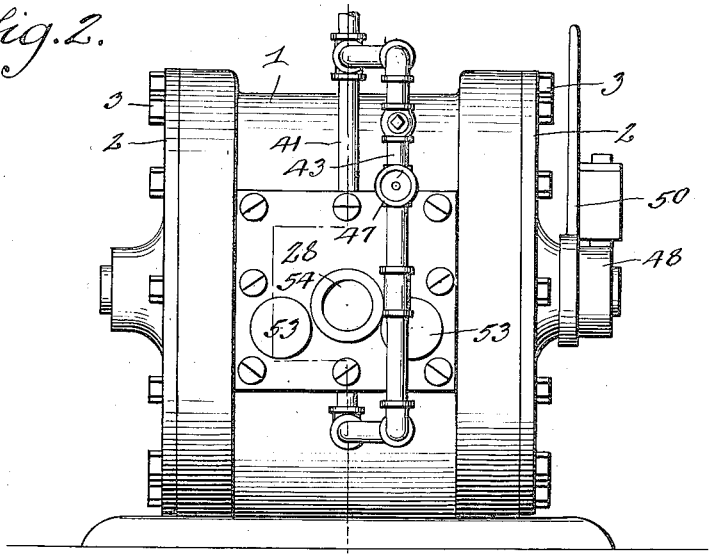
Fig. 2 is a view taken at right angles to Fig. 1.
Figure 7:
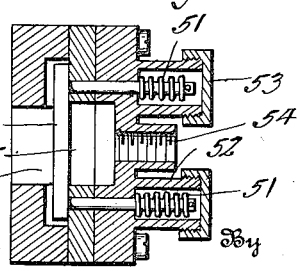
Fig. 7 is a fragmentary section on the line 7—7 of Fig. 3.
Figure 5:
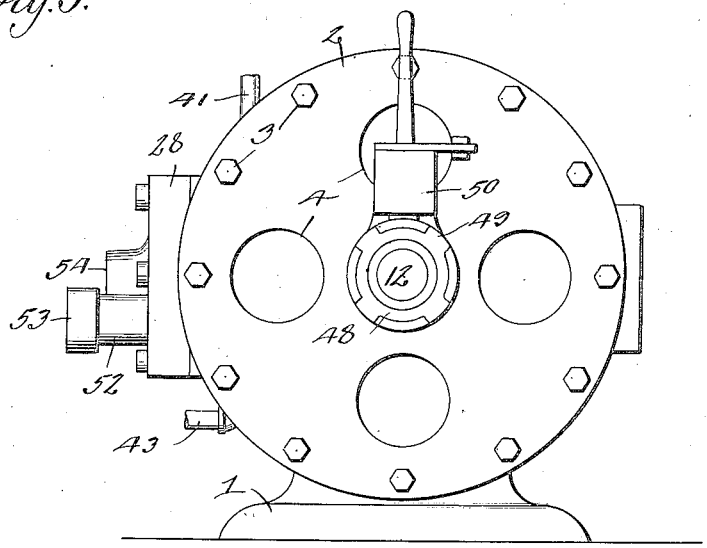
Fig. 5 is an elevation of the engine looking toward one end of the engine shaft.
Figure 8:
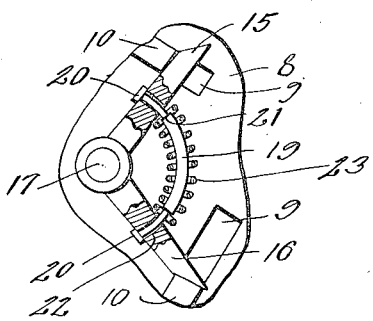
Fig. 8 is a fragmentary view showing the means for pressing the vanes or blades of the rotor outwardly.
Figure 9:
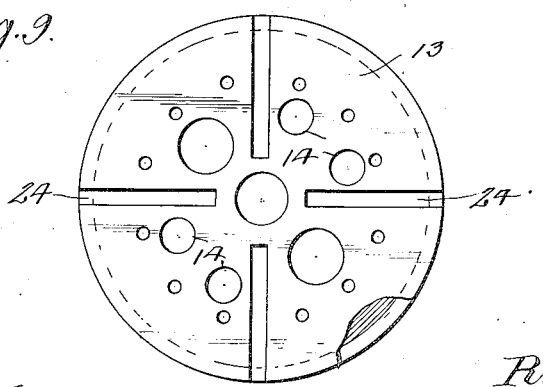
Fig. 9 is an inside face view of one of the rotor heads.

The rotary engine contemplated in this invention comprises a stationary casing embodying a generally cylindrical body 1 closed at its opposite ends by heads 2 which are rabbeted to receive the opposite edges of the body 1 and which are secured thereto by fastening means 3 such as cap screws or bolts. The heads 2 are formed with air cooling ports 4 and are formed in their inner faces with circular recesses 5 to allow cooled air to enter and leave the rotor which is also adapted for cooling air as will hereinafter appear.

Internally, the casing 1 is formed with diametrically opposite crescent shaped chambers 6 and 7, the chamber 6 serving as a suction and compression chamber, and the chamber 7 serving as an expansion chamber. Working in the stationary casing is a cylindrical rotor 8 having radially extending recesses or guideways 9 in which are slidably mounted radially movable vanes or blades 10, the outer edges of which work in contact with the inner peripheral wall of the stationary casing as shown in Fig. 3. The rotor is formed with air cooling passages 11 extending through the same parallel to the engine shaft 12 and the rotor is provided at the opposite ends thereof with heads 13, also formed with air ports 14. It will now be understood that air is thus enabled to circulate freely back and forth through the rotor thereby keeping the same in a comparatively cooled condition.

In conjunction with adjacently located blades or vanes 10, I employ yieldable operating means therefor, the same consisting of a pair of actuating arms 15 and 16 mounted upon a common stud 17 around which said arms are adapted to freely turn. The arm 15 works in one of the blades 10 and the other arm 16 works in the blade with which it coöperates. The two arms 15 and 16 are connected by an arcuate stem or rod 19 having heads 20 at the opposite ends thereof and also provided at suitable distances from the heads 20 with stop shoulders 21. The end portions of the stem or rod 19 are slidable through holes 22 in the arms 15 and 16, and a compression spring 23 is placed around the rod or stem 19 with its opposite extremities bearing against the arms 15 and 16. The mechanism just described, serves to maintain the outer edges of the blades 10 in contact at all times with the inner peripheral wall of the stationary casing and on account of the irregular formation of the interior of the casing, the spring 19 compensates for the variation in the degree of the angle between the arms 15 and 16. The heads 13 of the rotor are formed with radial guideways or grooves 24 for the adjacent edges of the blades 10. The rotor is also formed on opposite sides of each of the blades 10 with recesses in which are placed packing strips 25. The rotor casing is also formed with recesses to receive metal packing sections 26 and the latter are in turn formed with recesses to receive smaller packing strips 27 which bear directly against the periphery of the rotor to prevent leakage.

Arranged at one side of the stationary casing is a combustion or explosion chamber 28 having a compressed mixture inlet port 29 communicating with an outlet port 30 of the casing, the port 30 being in communication at all times with the suction and compression chamber 6. Mixture is admitted to the chamber 6 through a port 31 nearly opposite the port 30. 32 designates an inlet valve for the combustion chamber 28, said valve being normally held seated by means of a spring 33 contained in an inclosed chamber, said spring surrounding and engaging the stem of said valve. 34 represents an outlet valve for the combustion chamber 28 which controls the outlet port 35 of said chamber. The casing 1 is provided with an inlet port 36 in line with the port 35, for the purpose of admitting the ignited and expanded mixture to the expansion chamber 7 of the casing, where it acts against the adjacent blade or vane 10. The expanded and burned mixture finally passes out through an exhaust port 37 about opposite the port 36. A perforated plate 38 extends across the combustion chamber 28 to prevent the flame from reaching and passing through the ports 29 and 30 in case of back fire.

Extending upwardly from the port 30 is a passage 39 in which is arranged a back pressure check valve 40. Connected to the passage 39 is a pipe 41 which leads to a compressed mixture reservoir or drum 42. A pipe 43 leads off from the pipe 41 and extends downwardly and then upwardly where it communicates with a passage 44 leading into the outlet valve chamber 45. The passage 44 contains a back pressure check valve 46, and the pipe 43 contains a cut off valve 47 adapted to be operated by hand for the purpose of releasing compressed mixture to the combustion chamber 7 for self starting purposes.

Fast on the projecting end of the engine shaft 12 is an ignition timing collar 48 having four contacts 49 which may be advanced and retarded by means of a lever 50, the contacts referred to being in communication with the wires of a source of electrical energy, thus in each complete rotation of the engine shaft, four sparks and four explosions occur thereby producing an engine which operates with minimum vibration. When the engine is in operation, a portion of the compressed mixture entering the combustion chamber through the port 30, passes by the check valve 40 and through the pipe 41 into the reservoir 42, another portion of the gas filling the bypass or pipe 43 up to the stop cock 47. To start the engine, the stop cock 47 is opened, the compressed mixture passing by the valve 34, and through the port 36 into the expansion chamber 7 where it exerts pressure against the adjacent blade 10 and imparts movement to the rotor.

After the rotor has made a quarter revolution or less, a spark occurs in the combustion chamber 28, followed by an expansion and the discharge of the expanded mixture in the expansion chamber 7. The engine then maintains itself in operation and the cut off 47 is again closed so as to hold a new starting charge.

The closing spring 51 of the outlet valve 34 is contained in an offset closed chamber 52, the outer end of which is closed by a cap 53. The spring 51 is thus protected from the excessive heat of the explosions in the combustion chamber 28. The casing of the explosion chamber is provided with a threaded opening 54 for the spark plug.

I claim:—

1. In a rotary engine, the combination of a stationary casing, having a rotor chamber of elliptical formation, providing a substantially crescent shaped suction and compression chamber, and a similarly shaped expansion chamber, said chambers being diametrically opposed, a cylindrical rotor working in said casing and contacting at diametrically opposite points with the inner wall of said casing intermediate said crescent shaped chambers, radially movable blades carried by said rotor and working in contact with the inner peripheral wall of said casing, and means for yieldingly pressing said blades outwardly, said means comprising spring pressed arms having a common axis of movement and engaging said blades.

2. In a rotary engine, the combination of a stationary casing, having a rotor chamber of elliptical formation, providing a substantially crescent shaped suction and compression chamber, and a similarly shaped expansion chamber, said chambers being diametrically opposed, a cylindrical rotor working in said casing and contacting at diametrically opposite points with the inner wall of said casing intermediate said crescent shaped chambers, radially movable blades carried by said rotor and working in contact with the inner peripheral wall of said casing, and means for yieldingly pressing said blades outwardly, said means comprising in conjunction with adjacently located blades, a pair of arms mounted to turn on a common axis, and engaging said blades, an arcuate rod having the end portions thereof slidable through openings in said arms and terminally headed, and a compression spring encircling said arcuate rod and bearing at its opposite extremities against said arms.

3. In a rotary engine, the combination of a stationary casing, having a rotor chamber of elliptical formation, providing a substantially crescent shaped suction and compression chamber, and a similarly shaped expansion chamber, said chambers being diametrically opposed, a cylindrical rotor working in said casing and contacting at diametrically opposite points with the inner wall of said casing intermediate said crescent shaped chambers, radially movable blades carried by said rotor and working in contact with the inner peripheral wall of said casing, a combustion chamber at one side of said casing having an inlet port communicating with the suction and compression chamber of the casing and also having an outlet port communicating with the expansion chamber thereof, inlet and outlet valves for said combustion chamber, a bypass pipe adapted to receive a portion of the compressed gas before it enters said combustion chamber and to conduct the same to a point between said outlet valve and the combustion chamber, a cut off controlling said bypass pipe, and a compressed air reservoir in communication with said bypass pipe, an ignition device in said combustion chamber, and an electric timer mounted upon and rotating with the engine shaft.

In testimony whereof I affix my signature.

ROBERT R. VOGAN.